United States Patent [19]
Takamura et al.

[11] 3,961,985
[45] June 8, 1976

[54] NICKEL-ZINC CELL

[75] Inventors: Tsutomu Takamura, Kawasaki; Tamotsu Shirogami, Yamato; Yoshimi Kanada, Tokorozawa, all of Japan

[73] Assignee: Tokyo Shibaura Electric Co., Ltd., Japan

[22] Filed: Dec. 24, 1974

[21] Appl. No.: 536,153

Related U.S. Application Data

[63] Continuation of Ser. No. 346,450, March 30, 1973, abandoned.

[30] Foreign Application Priority Data

Mar. 10, 1973  Japan.................. 48-27603

[52] U.S. Cl.................... 136/28; 136/30; 136/111; 136/120 R
[51] Int. Cl.²...................... H01M 43/04
[58] Field of Search............ 136/28, 29, 107, 120 R, 136/24, 30, 31, 125, 138

[56] References Cited
UNITED STATES PATENTS

| | | |
|---|---|---|
| 1,393,739 | 10/1921 | Benner et al. ............. 136/30 |
| 3,042,551 | 7/1962 | Perry ................. 136/29 X |
| 3,066,178 | 11/1962 | Winkler ................. 136/24 |
| 3,069,486 | 12/1962 | Solomon et al. ............. 136/30 |
| 3,108,910 | 10/1963 | Herold ................. 136/29 |
| 3,230,113 | 1/1966 | Herold ................. 136/28 |
| 3,558,358 | 1/1971 | Ropp, Jr. ............. 136/28 X |
| 3,615,833 | 10/1971 | Jost ................. 136/28 |

*Primary Examiner*—Anthony Skapars
*Attorney, Agent, or Firm*—Oblon, Fisher, Spivak, McClelland & Maier

[57] ABSTRACT

The positive electrode of a nickel-zinc cell comprises a positive electrode composition containing less than 90 parts by weight manganese dioxide in 100 parts of nickel oxide which is mixed with an electroconducting material and binding material. The positive electrode composition, preferably is tightly covered with an electron conducting sheet containing many apertures. The nickel-zinc cells modified by these procedures have an improved capacity which is available during heavy current discharge loads, particularly under intermittent discharge, and the capacity loss of the cells during storage is reduced.

9 Claims, 1 Drawing Figure

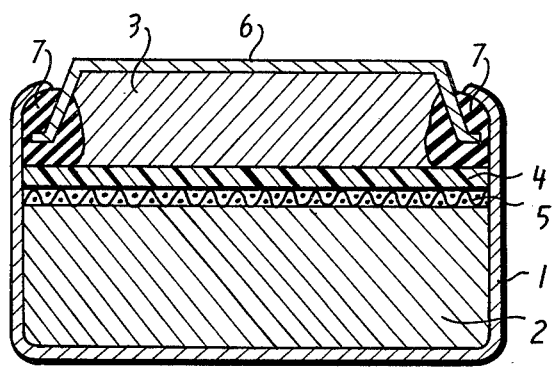

NICKEL-ZINC CELL

This is a continuation of application Ser. No. 346,450 filed Mar. 30, 1973, now abandoned.

BACKGROUND OF THE INVENTION

1. Field of the Invention

This invention generally relates to an alkaline nickel oxide-zinc cell and more particularly, to a primary alkaline nickel oxide-zinc cell containing a mixture of nickel oxide and manganese dioxide as the positive electrode material, wherein, preferably, an electroconductive sheet containing many apertures such as a wire netting, tightly covers the surface of the positive electrode. The alkaline cells with this positive electrode configuration are characterized by improved stability during the storage or shelf life of the cells and an improved capacity even under heavy current discharge loads.

2. Description of the Prior Art

It is well known that nickel oxide-zinc cells have high terminal voltage, flat voltage-time discharge characteristics and a high available capacity even at low temperature. However, these cells have the disadvantages of having an insufficient capacity under heavy discharge current loads, particularly, under intermittent heavy current loads. In addition, the capacity of the cells substantially reduces during storage of the cells.

In the battery art, several methods have been used in attempts to overcome these disadvantages. For example, the negative electrode has been improved by dispersing finely divided zinc particles or fibered zinc particles in a gel matrix which is prepared by mixing an alkaline electrolyte with a gel forming material and a metallic oxide stable under alkaline conditions. With this procedure, substantial improvement in the capacity of the negative electrodes has been achieved even under the influence of heavy current loads, particularly at temperatures as low as $-10°C$.

Other attempts to improve the cells have been concerned with improvements in the separator whose function is to prevent a short circuit between the negative and positive electrodes. These improvements had been achieved by the use of Cellophane sheets, porous plastic sheets or sheets of nonwoven plastic cloth durable to caustic alkali.

Still other attempts to improve the cells have been concerned with improvements in the positive electrode characteristics which have been achieved by impregnating an active nickel oxide into a porous nickel matrix which is made by sintering finely divided metallic nickel. The method is effective in increasing the capacity of the cell available under heavy current loads. However, the capacity of the cells containing this type of positive electrode during storage is seriously reduced because of the large self discharge of the cells. This disadvantage is too serious a handicap to use cells containing sintered nickel electrodes practically as primary cells.

In order to overcome the above mentioned disadvantage of the positive electrode, an alternative method of construction of the positive electrode has been provided, wherein pulverized nickel oxide is mixed with an electroconductive material such as graphite and a binder such as Portland cement or thermoplastics durable to oxidation in alkaline media. This method effectively prevents to some extent, the reduction of the capacity of the cell during storage. However, this advantage is achieved at the expense of reduced cell capacity available under heavy current loads, since the positive electrode material expands locally during heavy current discharge which results in poor conductivity due to loosening of the electrode material. An attempt has been made to improve the cycle life of secondary nickel-zinc cells by wrapping the positive electrode material with metallic wire netting. This method is effective in preventing loosening and collapsing of the formed electrode material. However, this method is ineffective in improving the capacity of primary cells under heavy current loads.

Still another method of improving the positive nickel electrode of a secondary cell has been tried, wherein the electrode is composed of a composition of nickel oxide and cobalt oxide. This method, however, is also ineffective in improving the capacity of primary cells when discharged under heavy current loads. On the other hand, when the positive electrode is composed of an active mixture of materials comprisng 100 parts of manganese dioxide and less than 100 parts of nickel oxide, the cycle life of the cells improves significantly compared to cells wherein only manganese dioxide is used as the positive electrode material. This method, however, is effective for use only in secondary alkaline cells, and there is the disadvantage that when these materials are used in primary cells, the terminal voltage is lowered compared to cells containing nickel oxide alone as the positive electrode material. In addition, the discharge curve of the cell is not flat, but decreases to a lower voltage during discharge of the cell. Still another disadvantage of the cells with the nickel oxide-manganese dioxide electrode mixture is that only a very low capacity is available when the cells are used at lower temperatures.

A need therefore, exists for cells of improved structure which maintain a sufficient capacity even under heavy current loads, and which have an improved stability while being stored.

SUMMARY OF THE INVENTION

Accordingly, one object of this invention is to provide a sealed alkaline nickel-zinc cell, particularly a flat or cylindrical sealed nickel-zinc cell having an improved capacity which is available under heavy current discharge loads, particularly at low temperatures.

Another object of the invention is to provide alkaline nickel-zinc cells having improved stability while being stored.

A further object is to provide alkaline cells having higher working voltages while having improved, flat, discharge curves compared to conventional alkaline manganese dioxide-zinc cells.

Briefly, these objects and other objects of this invention as hereinafter will become readily apparent can be achieved by using an improved positive electrode which is characterized by an improved positive electrode material consisting of 100 parts by weight of nickel oxide and 10 to 90 parts by weight of manganese dioxide, wherein the improvements are further enhanced by the addition of less than 10 parts by weight of at least one moiety selected from the group consisting of lithium cation, cobalt oxide and bismuth oxide. The positive electrode is further characterized by the presence of a wire netting, consisting of an expanded metal sheet or a metallic sheet containing many holes, which is placed tightly over the electrode surface opposite the negative electrode.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein:

The FIGURE is a cross-sectional diagram of the cell of this invention showing the arrangement of the various components which form the structure of the cell.

DESCRIPTION OF THE PREFERRED EMBODIMENTS

It has been found that certain nickel-zinc cells containing manganese dioxide in the composition of the positive electrode have improved capacity even under heavy current discharge loads and have an improved stability during storage provided that the amount of manganese dioxide in the composition is less than that of nickel oxide. Improved cells can be made in which the positive electrode material in the cell is comprised of 100 parts by weight of electrochemically or chemically synthesized nickel oxide and 10 to 90 parts by weight of manganese dioxide, wherein said positive electrode material is mixed with an electron conductive material such as graphite or acetylene black, and a binder such as Portland cement or a thermoplastic resin durable to alkaline media such as polystyrene, polyethylene, or polyfluoroalkenes such as polytetrafluoroethylene (PTFE).

With reference to the drawing, improved nickel-zinc cells can be assembled by placing the improved positive electrode composition 2 into can 1, which is durable to alkaline media, and which is used as the positive terminal of the battery. Next, a wire netting 5, containing many holes and consisting of an expanded metal sheet or a metallic sheet, is placed tightly over the electrode composition in the bottom of the can. This configuration of electrode material and wire netting gives a battery which achieves a homogeneous distribution of the current density over the surface of the positive electrode during heavy discharge of the cell. This further improves the utilization efficiency of the positive electrode materials 2. Over the wire netting 5 is placed a sheet of a nonwoven cloth such as polyamide, Acropore, or a porous sheet of a high polymer durable to alkaline media as separator 4. Finally, a negative electrode material 3 comprising zinc particles, a gel forming material and an alkaline electrolyte, is placed in the can over separator 4. Any empty spaces between electrodes 2 and 3, are filled with a caustic alkaline solution such as 35% KOH. The completed battery is sealed with negative electrode 6 and a nonconductive packing 7.

Materials suitable as separators in the cells of this invention include sheets of cellulose, or sheets of PTFE having incorporated therein an organic oxide durable to alkaline media which sometimes increases the effectiveness of the separator. A sheet of nonwoven cloth durable to the alkaline electrolyte may be used as an electrolyte holding material besides the separator, if necessary, and it may be placed between the two electrodes.

In order to improve the efficiency of the negative electrode, the negative electrode material may contain a metallic oxide which is stable in the presence of the alkaline electrolyte such as alumina, magnesia or titania. Suitable gel forming materials which are used in the negative electrode material 3 include carboxymethylcellulose, carboxyvinyl polymers, and polyacrylic acid and its metal salts.

It has been found that incorporation of at least one additive such as lithium cation, cobalt oxide or bismuth oxide in the positive electrode material increases the utilization efficiency of the electrode when it is incorporated into the oxide mixture. Preferably, no more than 10% by weight of the additive is included in the electrode mixture, as quantities in excess of this amount decrease the capacity of the cell.

It can be readily inferred from the foregoing description that mixtures of nickel oxide and manganese dioxide may be physically mixed or processed chemically. Chemically mixed positive electrode materials may be prepared, for example, by mixing two aqueous solutions of nickel nitrate and potassium permanganate in a hot solution of caustic alkali. After the vigorous reaction has subsided, the reaction product may be purified by repeated washings with a weak alkaline solution. A second procedure may be to pour a mixed solution containing nitrates of nickel and manganese into a heated solution of caustic alkali which contains sodium hypochlorite or sodium persulfate. The composition may be varied by changing the ratio of the two nitrate salts. It was found that the most active material could be obtained only when the final product is alkaline no matter what method was used.

The improvements achieved in the present invention may be explained on the basis of the volume contraction of manganese dioxide during discharge of the cell which compensates for the volume expansion of nickel oxide during discharge of the cell. This prevents loosening and the consequent collapsing of the processed positive electrode material. It is more important, however, that a mutual exchange of electrons occur in the participating valence states at the contact interface between particles of the active materials. This exchange results in the formation of a new substance whose chemical properties are more suitable for the active materials. In comparison, the positive electrode material containing a single active component of nickel oxide becomes less conductive during discharge of the cell because the product of the discharge reaction is $Ni(OH)_2$ which is nonconducting. Formation of $Ni(OH)_2$ causes a high resistance overvoltage. In contrast, the discharge product of the mixed electrode material of this invention is a semi-conductive material which is effective in preventing a resistance increase in the positive electrode composition. This semiconductive effect is enhanced by the presence of lithium cation, or the oxides of cobalt or bismuth.

If the amount of manganese dioxide exceeds that of nickel oxide in the positive electrode material, the following undesirable properties become apparent such as lowering of the electrode voltage, the reaction rate of the discharge of the cell decreases, particularly at low temperatures and the discharge curve of the cell becomes less flat so that it increasingly approximates the undesirable discharge curves of cells which contain manganese dioxide alone as the positive electrode material.

The improvements imparted to the cell by placing a sheet of electron conducting material such as wire netting, an expanded metal sheet or a metallic sheet containing many apertures, over the surface of the positive electrode is explained as follows.

Detailed examination of an actual cell has proved that the lateral current distribution near the surface of the positive electrode becomes inhomogeneous with an increase in the discharge load. This is accompanyied by an inhomogeneous supply of water from the electrolyte to the positive electrode mixture. Therefore, the discharge of current across the surface of the positive electrode is inhomogeneous resulting in heavy current flow only in local areas across the surface of the electrode, and the density of the current discharged locally differs from the current density of the electrode material. This results in loosening or collapsing of the processed electrode material which reduces the capacity of the cell.

When one of the electron conducting sheets of this invention is placed over the surface of the positive electrode material, significant improvement in the current homogeneity over the surface of the electrode is observed. A porous sheet of sintered metallic nickel is particularly effective. Generally, the improvement in the current homogeneity is a function of the size of the holes or apertures in the metallic sheet. This improvement is observed particularly, in the instances where wire netting, expanded metal sheets and metallic sheets containing many holes are used. A detailed examination has indicated that the optimum range in the size of the apertures is 25 to 200 mesh. The improved effect is also dependent on the ratio of the total open area of the aperture to the total area of the particular electroconducting sheet used. In the case of metallic sheets containing many apertures, the improved effect is most significant when the ratio of the total open area to the total area of the sheet used is greater than 0.5.

The electroconducting material which is used in the positive electrode composition in accordance with this invention may be graphite powder, acetylene black, fine particles of silver, nickel or fluorocarbon. The use of large amounts of nickel particles, however, is not preferred because they cause increased reduction of the capacity of the cell during storage.

Having generally described this invention, a further understanding can be obtained by reference to certain specific examples which are provided herein for purpose of illustration only and are not intended to be limiting unless otherwise specified. In the following examples the amounts of ingredients mixed are expressed in parts by weight.

EXAMPLE 1

A 500 ml amount of 2 molar aqueous nickel nitrate was poured with stirring into 8 l of a 10 molar KOH solution containing 10% sodium hypochlorite at 90°C. After mixing the reactants the temperature of the mixture was maintained at 90°C for 1 extra hour, and then the solution was allowed to stand for 24 hours. The resulting black precipitate was washed repeatedly with a large amount of 0.2 molar KOH solution, and afterwards the water was removed by vaporization. Finally, black nickel oxide electrode material was obtained by drying the black precipitate at 90°C overnight and by pulverizing it.

After mixing 50 g of the positive electrode material, 30 g of electrolytic $MnO_2$, 15 g of flake graphite and 5 g of polyethylene powder in a V shaped mixer, 20 ml of 7 molar KOH was added to the mixture. A 0.75 g quantity of the mixed electrode material was weighed and pressed into the interior of a can of an H-C flat cell which is specified by the Japanese Industrial Standard (JIS) under a pressure of 2 ton/cm$^2$.

On the exposed face of the compressed composition, a sheet of Acropore was placed followed by a 0.3 mm thick sheet of a nonwoven cloth of cotton. On top of the cloth was placed 0.5 g of a negative electrode mixture followed by ZnO saturated with 210$\mu$ of a 40% KOH solution. A sealed nickel-zinc cell was assembled by covering the can with a plate which acts as the negative electrode and a rubber packing which acts as an insulator. The negative electrode material was comprised of 100 parts of 100 mesh zinc particles which were amalgamated with 10% Hg, 2 parts of zinc oxide, 2 parts of magnesium oxide and 1.8 parts of carboxyvinyl polymer. A gel was formed by mixing 100 parts of the negative electrode material with 70 parts of 35% KOH.

As a reference example, the same cell was assembled as disclosed above except that nickel oxide was used in the same amount as that of $\gamma$-$MnO_2$ in the positive electrode material. The cells thus assembled were subjected to an intermittent 15$\Omega$ discharge at 20°C, wherein the "on" and "off" periods were 10 and 20 seconds, respectively. The results in Table I are reported as the number of on times attained until the voltage of the cells was reduced to the specified minimum voltages indicated in the headings of Table I. Each value shown in the table was obtained by averaging the voltage received from nine cells.

TABLE I

| Positive electrode material | Minimum Average Voltage (Volts) | | | | | |
|---|---|---|---|---|---|---|
| | 1.20 | 1.10 | 1.00 | 0.95 | 0.90 | 0.85 |
| Reference electrode (No $\gamma$-$MnO_2$ present) | 1 | 22 | 61 | 78 | 93 | 112 |
| Invention electrode ($\gamma$-$MnO_2$ present) | 2 | 34 | 92 | 114 | 132 | 140 |

These results clearly indicate that the presence of 38% $\gamma$-$MnO_2$ in the positive electrode material improved the intermittent heavy load capacity of the cell. The same improvement was also found when acetylene black or silver powder was used as the electroconductive material instead of flake graphite.

The same test as described above was conducted at −10°C. The reference example used was a silver-zinc cell, which was made by the same procedure with the same materials as the cell of this invention except that the positive electrode material, contained $Ag_2O$ in the same amount as the $MnO_2$ used in the cell of the invention. Fifteen repetitive discharges were attained with the cell of this invention until the minimum average voltage of 0.9 volts was reached. On the other hand, only three discharges were obtained with the silver oxide reference cell. This data indicates that the cell of the invention has better properties than the reference cells at lower temperatures. The same nickel-zinc cell of this invention and one of the reference cells described above were stored at 45°C in an atmosphere of 85% relative humidity for 3 months. The cells were then subjected to a 500$\Omega$ continuous discharge and the capacities lost during storage of the cells were evaluated by comparing the capacity of each cell at the minimum voltages specified in Table II with the capacity of each cell before storage. The percent reduction of the capacity of each cell during storage at the minimum voltages shown in Table II is based on the comparison of the data obtained for the cells before and after storage. The data obtained at the minimum voltages shown are the average values received from 10 cells.

TABLE II

| Positive electrode material | Reduced Capacity during Storage (%) at the minimum average voltage shown (volts) | | | | |
|---|---|---|---|---|---|
| | 1.40 | 1.30 | 1.20 | 1.10 | 1.00 |
| Reference cell (No $\gamma$-MnO$_2$ present) | 22.2 | 19.9 | 20.4 | 21.0 | 21.8 |
| Cell of invention (38% $\gamma$-MnO$_2$ present) | 10.5 | 10.2 | 11.8 | 11.2 | 10.2 |

The data received shows that a large capacity reduction was obtained in the reference cells containing no $\gamma$-MnO$_2$ in the positive electrode material. The presence of 38% by weight $\gamma$-MnO$_2$ in the electrode material of the cells of this invention substantially prevent capacity reduction at high temperatures.

EXAMPLE 2

An 80 mesh nickel screen was subjected to a pressure of 1 ton/cm$^2$, from which was punched a 12 mm diameter disk. The disk was placed on and pressed against the surface of the positive electrode material which was made by the same procedure as disclosed in Example 1. On the surface of the screen, the same materials disclosed in Example 1 were placed in successive parallel layers, and a sealed H-C type nickel-zinc cell was assembled. The cell thus obtained was subjected to the same discharge test at 20°C as described in Example 1. The results obtained are shown as follows in Table III.

TABLE III

| | Minimum Average Voltage (Volts) | | | | | |
|---|---|---|---|---|---|---|
| | 1.20 | 1.10 | 1.00 | 0.95 | 0.90 | 0.85 |
| Electrode containing an 80 mesh screen | 3 | 49 | 142 | 156 | 174 | 181 |

It is apparent that the presence of the screen further improves the capacity of the cell during intermittent discharge under heavy current loads.

The size of the wire netting was also examined. Nickel-zinc cells were assembled by the same procedure as described above, however, the mesh of the wire netting was varied from 10 to 200 mesh. The cells were subjected to the same discharge tests described above. Table IV below shows the number of times the cells were switched on during the intermittent discharge period until the average minimum voltage of 0.90 volts was attained. The results are indicated in Table IV.

TABLE IV

| Netting mesh | 10 | 25 | 32 | 60 | 80 | 125 | 150 | 200 | 250 |
|---|---|---|---|---|---|---|---|---|---|
| Number of discharge times | | 134 | 147 | 158 | 167 | 174 | 165 | 153 | 148 | 110 |

It is apparent from the data that the wire netting whose mesh size varies from 25 to 200 effectively improves cell performance under heavy current loads.

EXAMPLE 3

The anodic electrode materials were mixed by the same procedure as described in Example 1 but the mixing ratio of nickel oxide and $\gamma$-MnO$_2$ was varied.

The ratios used are shown in Table V. The positive electrode composition was prepared by mixing 100 parts of said active material with 10 parts of the flake graphite and a 5 parts of dispersed teflon. By using 0.76 g of the positive and negative electrode mixtures thus prepared, nickel-zinc cells were assembled by the same procedure disclosed in Example 2. Cells were subjected to the following three tests: (a) An intermittent discharge test at 20°C which was the same as described in Example 1: (b), Cells were stored at 45°C in an atmosphere of 85% relative humidity for 3 months and then subjected to a 500Ω continuous discharge for a period which lasted until an average minimum voltage of 1.0 volt was reached; (c) In test (b), the working voltage was measured when one-half of the total capacity of the cells was discharged. The results obtained as a function of the varied mixing ratios of the anodic electrode composition are summarized in Table V.

TABLE V

| Anodic Electrode Composition (parts by weight) | | test (a) 10Ω load of repetitive intermittent discharge (number of times) | test (b) Discharge period (hours) | test (c) Working average voltage (volts) |
|---|---|---|---|---|
| nickel oxide | $\gamma$-MnO$_2$ | | | |
| 50 | 0 | 92 | 26.2 | 1.52 |
| 50 | 10 | 127 | 29.7 | 1.50 |
| 50 | 20 | 144 | 38.4 | 1.50 |
| 50 | 30 | 155 | 36.5 | 1.49 |
| 50 | 40 | 120 | 32.4 | 1.46 |
| 50 | 50 | 93 | 27.6 | 1.42 |
| 50 | 60 | 83 | 22.3 | 1.36 |
| 50 | 70 | 71 | 20.5 | 1.34 |

These results clearly indicate that an appreciable improvement in capacity, storage life and working voltage is achieved when the amounts of nickel oxide mixed in the electrode composition exceeds that of $\gamma$-MnO$_2$ and that particularly good results are obtained in the range of 20 or 40 parts by weight of $\gamma$-MnO$_2$ with 50 parts by weight of nickel oxide. These results indicate that the most effective range for the incorporation of $\gamma$-MnO$_2$ in the total electrode material is less than 45% by weight.

EXAMPLE 4

A 500 ml amount of a 2.0 molar solution of nickel nitrate was mixed with 400 ml of a 2.0 molar solution of manganese nitrate. The combined nickel and manganese solutions were added to a mixture of 2l of a 10% solution of sodium hypochlorite and 4l of 14 molar KOH with continuous stirring until a black precipitate containing nickel and manganese oxides was obtained.

After allowing the solution to stand for one day, the precipitate was separated, washed and dried by the same procedure as described in Example 1, and a black powder suitable for use as an electrode material was obtained. Analysis of the black powder showed that the atomic composition of nickel and manganese was 50: 38 by weight.

The black powder containing NiO and $MnO_2$ was used as the positive electrode material. An 80 g amount of the powder was mixed with 15 g of flake graphite and 5 g of polyethylene powder in a V shaped mixer, and 20 ml of a 7 molar solution of KOH was added to the mixture. A 0.75 g quantity of the mixed materials was weighed, and the mixture was compressed under a pressure of 2 tons/cm$^2$ into the interior of a can of an H-C flat cell which is as specified by JIS (Japanese Industrial Standard). A nickel-zinc cell was assembled using this compressed material, as the positive electrode material, and was tested by the same procedures as described in Example 1. The results obtained are shown in Table VI, and each value shown represents a 10 cell average. The number of on repetitions achieved for each cell tested until the minimum average voltage values were reached are indicated in Table VI under the heading "minimum voltage".

TABLE VI

| | Minimum Average Voltage (Volts) | | | | | |
|---|---|---|---|---|---|---|
| | 1.20 | 1.10 | 1.00 | 0.95 | 0.90 | 0.85 |
| Reference cell electrode material (no Mn present) | 1 | 22 | 61 | 78 | 92 | 111 |
| Electrode material of invention cell (38% Mn present in oxide mixture) | 3 | 32 | 86 | 108 | 122 | 137 |

The results obtained clearly indicate that improvements were achieved when the positive electrode material was prepared by a chemical method. Other positive electrode materials were prepared by the same method disclosed above, but the following nitrate compositions were used instead of the composition described above:

A. A ternary mixture of 50 parts of 2 molar nickel nitrate, 40 parts of 2 molar manganese nitrate and 8 parts of 2 molar cobalt nitrate.

B. A ternary mixture consisting of 50 parts of 2 molar nickel nitrate, 40 parts of 2 molar manganese nitrate and 8 parts of 1 molar acidic bismuth nitrate.

C. A ternary mixture consisting of 50 parts of 2 molar nickel nitrate, 40 parts of 2 molar manganese nitrate and 20 parts of 0.5 molar lithium nitrate.

Solutions of the three different compositions were used to prepare black positive electrode materials into which cobalt, bismuth, or lithium, respectively, were incorporated. The content of the incorporated ions in the mixture was 7% by weight of Co (Sample 4a), 4% by weight Bi (Sample 4b), and 1.8% by weight Li (Sample 4c), respectively.

Samples of each of the three materials were used as the positive electrode material for the preparation of nickel-zinc cells of the same type tested above, and the cells were subjected to the same discharge test as described in Example 1. The results are shown in Table VII.

TABLE VII

| Composition of positive electrode material | Minimum Average Voltage (volts) | | | | | |
|---|---|---|---|---|---|---|
| | 1.20 | 1.10 | 1.00 | 0.95 | 0.90 | 0.85 |
| Sample 4a | 2 | 34 | 98 | 128 | 147 | 162 |
| Sample 4b | 3 | 39 | 106 | 129 | 142 | 157 |
| Sample 4c | 3 | 41 | 108 | 127 | 140 | 148 |

The data obtained indicates that the presence of Co. Bi or Li in the positive electrode material improved the capacity of the cells during intermittent discharge under heavy current loads. Examination of the effective ranges for both of the oxides of Co and Bi and for the Li cation in the positive electrode material was found to be 1.5 to 10% by weight and 0.1 to 5% by weight respectively.

Having now fully described this invention, it will be apparent to one of ordinary skill in the art that many changes and modifications can be made thereto without departing from the spirit or scope of the invention as set forth herein.

What is claimed as new and intended to be covered by Letters Patent is:

1. A nickel-zinc cell comprising a compressed positive nickel electrode composition in the bottom of a cell, a negative zinc electrode composition on top of said positive electrode composition and an alkaline electrode and a separator disposed between said positive and negative electrode compositions, the positive nickel electrode composition comprising an electron conducting material, a positive electrode material comprising 100 parts by weight nickel oxide and 40 to 60 parts by weight manganese dioxide, and a binding material, whereby the capacity of said nickel-zinc cell is increased under heavy current discharge loads and the capacity loss of said nickel-zinc cell is reduced during storage of the cell.

2. The nickel-zinc cell of claim 1, wherein said positive electrode material contains 1.5 to 10% by weight cobalt oxide.

3. The nickel-zinc cell of claim 1, wherein said positive electrode material contains 1.5 to 10% by weight bismuth oxide.

4. The nickel-zinc cell of claim 1, wherein said positive electrode material contains 0.1 to 5% by weight lithium cation.

5. The nickel-zinc cell of claim 1, wherein said electron conducting material is acetylene black, graphite or fine particles of silver, or nickel or a fluorocarbon.

6. The nickel-zinc cell of claim 1, wherein said binding material is selected from the group consisting of Portland cement, thermoplastic resins durable to alkaline media and polyfluoroalkenes.

7. The nickel-zinc cell of claim 1, wherein said positive nickel electrode composition is tightly covered by an electron conducting sheet containing many small apertures whereby the capacity of said cell is improved under heavy current discharge loads.

8. The nickel-zinc cell of claim 7, wherein said electron conducting sheet tightly covering the surface of said positive nickel electrode composition is a wire netting, an expanded metal sheet containing many apertures or a metal sheet containing many apertures.

9. The nickel-zinc cell of claim 8, wherein said electron conducting sheet is 25 to 200 mesh wire netting.

* * * * *